United States Patent
Scivicque (12) United States Patent (10) Patent No.: US 12,244,774 B2
(45) Date of Patent: Mar. 4, 2025

(54) SYSTEMS AND METHODS FOR HANDLING CALL IDENTITY REQUIREMENTS

(71) Applicant: CenturyLink Intellectual Property LLC, Broomfield, CO (US)

(72) Inventor: Joseph Scivicque, Lafayette, LA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 189 days.

(21) Appl. No.: 18/153,040

(22) Filed: Jan. 11, 2023

(65) Prior Publication Data

US 2023/0300252 A1    Sep. 21, 2023

Related U.S. Application Data

(60) Provisional application No. 63/269,353, filed on Mar. 15, 2022.

(51) Int. Cl.
*H04M 3/58* (2006.01)
*H04M 3/436* (2006.01)

(52) U.S. Cl.
CPC ............ *H04M 3/58* (2013.01); *H04M 3/436* (2013.01)

(58) Field of Classification Search
CPC .................. H04M 3/58; H04M 3/436; H04M 2203/6045; H04M 7/006
See application file for complete search history.

(56) References Cited

U.S. PATENT DOCUMENTS

| | | | |
|---|---|---|---|
| 9,667,775 B1* | 5/2017 | Haltom | H04M 3/2281 |
| 10,542,137 B1* | 1/2020 | Sial | H04M 1/571 |
| 11,323,563 B1* | 5/2022 | Rao | H04L 61/2503 |
| 2008/0002820 A1* | 1/2008 | Shtiegman | H04L 65/1094 370/352 |
| 2019/0116268 A1* | 4/2019 | Li | H04L 65/1069 |
| 2020/0028690 A1* | 1/2020 | Barakat | H04L 9/3247 |
| 2021/0203700 A1* | 7/2021 | Asveren | H04L 65/1069 |
| 2023/0088868 A1* | 3/2023 | Haltom | H04L 65/1104 370/352 |

* cited by examiner

*Primary Examiner* — Akelaw Teshale (57) ABSTRACT

The present disclosure describes providing end-to-end call identity validation of a forwarded call. Identity information associated with a received call invite may be temporarily stored and reused for the forwarded call when a determination is made that the called party is likely to forward the call. If the inbound call is diverted (forwarded) by the called device, a call invite comprising an indication that the invite has been diverted (forwarded) by the called device may be received. The system may match data associated with the diverted call invite with the stored identity information. In some examples, the SHAKEN identity header and SHAKEN token is stored and may be attached to the diverted call invite. DIV authentication may then be performed, and the diverted call invite comprising SHAKEN and DIV identity headers may be provided to the forward-to destination.

20 Claims, 5 Drawing Sheets

SYSTEMS AND METHODS FOR HANDLING CALL IDENTITY REQUIREMENTS

CROSS-REFERENCE TO RELATED APPLICATIONS

This application claims the benefit of U.S. Provisional Application No. 63/269,353 filed on Mar. 15, 2022, entitled "Systems and Methods for Handling Call Identity Requirements," which is incorporated herein by reference in its entirety.

BACKGROUND

SHAKEN (Signature-based Handling of Asserted information using toKENs) framework and STIR (Secure Telephony Identity Revisited) protocols, from which the SHAKEN framework is based, may be implemented by telecommunications service providers to help prevent robocalls and spoofed calling numbers. For example, STIR/SHAKEN may enable service providers to cryptographically sign (or attest) calls in a Session Initiation Protocol (SIP) header of a Voice over Internet Protocol (VoIP) communication. With STIR/SHAKEN, the SIP header may include a first (SHAKEN) identity header indicating a level of confidence from the originating service provider to signal whether the party originating the call has the right to use the number via an attestation field.

In some cases, a call directed to a called party may be redirected (e.g., forwarded) by the called party to another destination. Thus, STIR/SHAKEN may provide for a second (DIVERSION) identity header to be added to the forwarded call so that the forward-to destination's service provider can confirm the call has been legitimately retargeted. Thus, the redirecting service provider (of the originally called party) may be configured to generate another SHAKEN identity header and the DIVERSION identity header for the forwarded call.

It is with respect to this general technical environment that aspects of the present technology disclosed herein have been contemplated. Furthermore, although a general environment is discussed, it should be understood that the examples described herein should not be limited to the general environment identified herein.

SUMMARY

The present disclosure describes a system and method for providing identity information handling for supporting end-to-end call identity validation of a forwarded communication, such as, for example, a Voice over Internet Protocol call. The identity validation may provide a level of security to a forward-to network and/or recipient that the phone number associated with the communication is secure or has not been spoofed.

Accordingly, the present disclosure describes a method for providing identity information handling for supporting end-to-end call identity validation of a forwarded call. In some examples, the method includes: receiving an original call invite initiated by a calling device and directed to a called device, wherein the original call invite includes an original identity header; verifying the original identity header; determining whether the called device is likely to forward the original call invite; in response to determining the called device is likely to forward the original call invite, storing identity information associated with the original call invite in association with customer data associated with the called device; routing the original call invite to the called device; receiving a diverted call invite including an indication that the called device is a forwarding device of the diverted call invite and an indication that a forward-to destination is an intended recipient of the diverted call invite; determining whether the diverted call invite matches the stored identity information associated with the original call invite; in response to determining the identity information associated with the original call invite matches the diverted call invite, attaching the original identity header to the diverted call invite; and routing the diverted call invite to the forward-to destination.

The present disclosure further describes a system for providing identity information handling for supporting end-to-end call identity validation of a forwarded call. In an example, the system comprises: at least one processor; and memory storing instructions that, when executed by the at least one processor, cause the system to: receive an original call invite initiated by a calling device and directed to a called device, wherein the original call invite includes an original identity header; verify the original identity header; determine whether the called device is likely to forward the original call invite; in response to determining that the called device is likely to forward the original call invite, store identity information associated with the original call invite in association with customer data associated with the called device; route the original call invite to the called device; receive a diverted call invite including an indication that the called device is a forwarding device of the diverted call invite and an indication that a forward-to destination is an intended recipient of the diverted call invite; determine whether the diverted call invite matches the stored identity information associated with the original call invite; in response to determining the identity information associated with the original call invite matches the diverted call invite, attach the original identity header to the diverted call invite; and route the diverted call invite to the forward-to destination, wherein the diversion identity header and the original identity header provide end-to-end call identity validation of the diverted call invite.

The present disclosure further describes a computer-readable storage medium for providing identity information handling for supporting end-to-end call identity validation of a forwarded call. In an example, the computer-readable storage medium storing instructions, when executed by a computer, cause the computer to: receive an original call invite initiated by a calling device and destined for a called device, wherein the original call invite includes an original SHAKEN identity header; verify the original SHAKEN identity header; in response to a determination that the called device is likely to forward the original call invite, temporarily store identity information associated with the original call invite in association with customer data associated with the called device; route the original call invite to the called device; receive a diverted call invite including an indication that the called device is a forwarding device of the diverted call invite and an indication that a forward-to destination is an intended recipient of the diverted call invite; when the diverted call invite does not include the original SHAKEN identity header, match the diverted call invite to the temporarily stored identity information associated with the original call invite; in response to determining the identity information associated with the original call invite includes the original SHAKEN identity header, attach the original SHAKEN identity header to the diverted call invite; in response to determining the identity information associated with the original call invite includes one or more identity characteristics from the original SHAKEN identity header: include the one or more identity characteristics in a SHAKEN authentication request, wherein the one or more identity characteristics include an attestation level assigned to the original call invite; and include a resulting forwarding party-generated SHAKEN identity header in the diverted call invite; include the indication that the forward-to destination is the intended recipient of the diverted call invite and the indication that the called device is the forwarding device of the diverted call invite in a diversion authentication request; include a resulting diversion identity header in the diverted call invite; and route the diverted call invite to the forward-to destination, wherein the diversion identity header and the original or forwarding party-generated SHAKEN identity header provide end-to-end call identity validation of the diverted call invite.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In order to help prevent robocalls that may alter or spoof a calling number in an attempt to deceive a called party, standards and mechanisms have been developed that allow verification and validation of a calling party's authorization to use a particular telephone number. For example, a baseline SHAKEN (Signature-based Handling of Asserted information using toKENs) framework and STIR (Secure Telephony Identity Revisited) protocols support an end-to-end call authentication for a common 2-way call scenario where a first user (calling party) may call a second user (called party). For this case, the originating network service provider (of the calling party) may generate a SHAKEN PASSporT (Personal ASSertion Token), herein referred to as a SHAKEN token, including a set of claims that may assert that the calling telephone number is authorized to be used as the originating identity for that specific call. For example, the STIR/SHAKEN protocol provides for three different levels of verification or attestation—Full Attestation (Level A), Partial Attestation (Level B), and Gateway Attestation (Level C). In order to achieve Full Attestation, the originating service provider must be able to authenticate the calling party and verify that the calling party is authorized to use the calling number. In order to achieve Partial Attestation, the originating service provider must be able to authenticate the origin of the call but is not required to verify that the calling party is authorized to use the calling number. In order to achieve Gateway Attestation, the originating service provider must be able to authenticate from where the call was received even if the service provider cannot authenticate the source of the call.

The SHAKEN token may be included in a first identity header (SHAKEN identity header) in a call invite directed to the terminating network service provider (of the called party). The called party's service provider can then verify that the SHAKEN token signature is valid, and that the called number matches a destination claimed in the SHAKEN token. Upon verification of the SHAKEN token, the call invite may be routed to the called party. Accordingly, the called party may be enabled to determine with a high degree of certainty that the calling number identifies the calling party.

In some examples, the call may be retargeted to a third user or device (forward-to destination). For example, the called device (e.g., a customer premises equipment (CPE) device) may be operative to divert incoming calls to a new destination in the global network. Thus, the called device may retarget the incoming call invite back to the called party's service provider to establish a divert-to call leg, where information included in the invite may indicate that the invite has been diverted (forwarded) by the called device.

In some examples, the original called party's service provider (which may now be referred to as a forwarding service provider) may generate and sign a DIVersion (DIV) PASSporT (token) including the forward-to telephone number, which may be included in a second identity header (DIV identity header) added to the diverted call invite directed to the forward-to destination. For example, the DIV token may indicate to the forward-to destination that the original called number in the SHAKEN token no longer reflects the destination to which the call is to be delivered.

In some examples, STIR/SHAKEN identity passthrough may not be supported, where, upon receiving the original call invite from the calling party and verifying that the SHAKEN identity header is valid, the forwarding service provider may remove the SHAKEN identity header prior to passing the call invite to the called party. Thus, the forwarding service provider may need to generate another SHAKEN token to attach to the diverted call invite. According to an example, the forwarding service provider may generate and sign the other SHAKEN token based on information available to the forwarding service provider. Thus, when the original called device forwards the call and diverts the call invite (without a SHAKEN identity header) to the forwarding service provider for redirection to the forward-to destination, the forwarding service provider may operate to perform SHAKEN authentication to generate and add the second SHAKEN token to the diverted call invite.

As can be appreciated, performing SHAKEN authentication for a diverted call invite may require additional processing resources by the forwarding service provider. For example, the forwarding service provider may expend compute resources to check the phone number and call source to determine an attestation level for the diverted call invite and to generate the SHAKEN token signature using asymmetric cryptographic techniques. As can be further appreciated, when the forwarding service provider determines the attestation level, it may not be able to fully attest the validity of the original calling number based on the information received from the original called party in the diverted call invite. Thus, even if the original call invite was fully attested by the original calling party's service provider, the forwarding service provider may not be able to provide the same attestation level for the diverted call invite. Accordingly, the forward-to destination may not be provided with accurate attestation information for the forwarded call.

As such, the present disclosure describes a system and method that can be used to temporarily store identity information associated with a received call invite that can be reused for supporting end-to-end call identity validation of a forwarded call. As will be described in further detail below, in some examples, the system may operate to temporarily store identity information associated with an inbound call invite that is destined for a called party's (called) device that is determined to likely forward the call. If the inbound call is diverted (forwarded) by the called device, a call invite comprising an indication that the invite has been diverted (forwarded) by the called device may be received. The system may further operate to match data associated with the diverted call invite with the temporarily stored identity information. In some examples, the temporarily stored identity information may include a SHAKEN identity header including a SHAKEN token signed by the originating calling service provider, and the system may operate to attach the stored SHAKEN identity header, provide DIV authentication, and provide the diverted call invite (comprising a DIV identity header and the SHAKEN identity header that was included in the original call invite and that was temporarily stored) to the forward-to destination. In other examples, the temporarily stored identity information may include attestation information associated with the original call invite, and the system may operate to perform SHAKEN and DIV authentication. For example, the system may perform SHAKEN authentication based on the stored attestation information, perform DIV authentication, and then provide the diverted call invite comprising SHAKEN and DIV identity headers to the forward-to destination.

The forward-to destination may perform both a SHAKEN and a DIV verification procedure to verify that there is an unbroken chain of authority from the calling party number to the forward-to destination claimed in the SHAKEN token. For example, the forward-to destination may verify that the forward-to telephone number matches the DIV token destination claim and that the forwarding telephone number matches the SHAKEN token destination claim. According to an aspect of the present disclosure, because the SHAKEN identity header information of the original call invite is reused for the diverted call invite, the attestation information included in the original call invite may be preserved. As can be appreciated, reusing the SHAKEN identity header information may improve efficiency of the system as, in some examples, compute resources may not be needed to perform SHAKEN authentication for the diverted call invite. Moreover, the diverted call invite may be attested at a same attestation level as the original call invite, thus improving accuracy of attestation of calls that may be retargeted by features such as call-forwarding. Although examples of the present disclosure are provided in context of a STIR/SHAKEN protocol environment, systems and methods of this disclosure may be useful in other identity protocol contexts. These and other aspects are explained in more detail below with respect to FIGS. 1-4.

Figure 1:
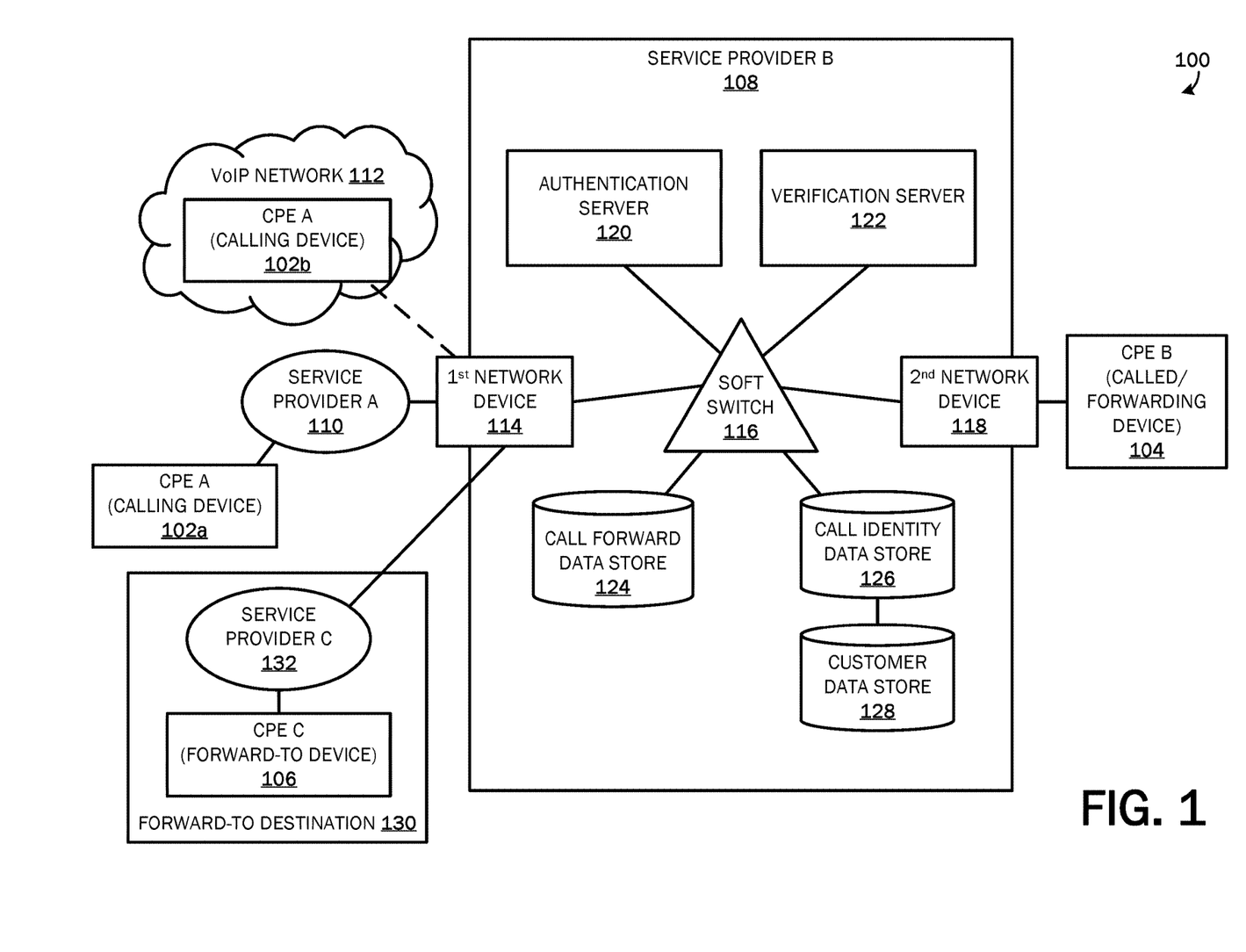
FIG. 1 is a block diagram of a system for providing identity information handling for supporting end-to-end call identity validation of a forwarded call according to an example.

With reference now to FIG. 1, an example system 100 for providing identity information handling for supporting end-to-end call identity validation of a forwarded communication, such as, for example, a Voice over Internet Protocol (VoIP) call, is illustrated according to an example. The system 100 may include a telecommunications network service provider system of a called party, which is depicted in FIG. 1 as service provider B 108, and which may sometimes be referred to herein as a called service provider or a forwarding service provider. The called party may be a customer of service provider B 108 and may use a customer premises equipment (CPE) device, such as a telephone, mobile phone, VoIP phone, VoIP soft client, or the like, to initiate and receive calls, such as Session Initiation Protocol (SIP) or time division multiplexing (TDM) calls. The called CPE device is depicted in FIG. 1 as CPE B 104, and may have a unique telephone number assigned to it, which may sometimes be referred to as a called number, a forwarding number, or a diverting number.

Service provider B 108 may include or be in communication with one or more computing systems that may operate to receive and route communications destined for customers of service provider B 108 and to route communications from customers destined to other devices in and/or out of service provider B's communication network. According to an example implementation, service provider B 108 may include a first network device 114, a soft switch 116, a second network device 118, an authentication server 120, a verification server 122, a call forward data store 124, a call identity data store 126, and a customer data store 128.

In some examples, service provider B 108 may operate to receive a communication, such as a call invite, from a telecommunications network service provider system (depicted in FIG. 1 as service provider A 110 of a calling party depicted as CPE A 102*a*). In other examples, service provider B 108 may operate to receive the communication from a CPE (depicted in FIG. 1 as CPE A 102*b*) operating on a VoIP network 112 operated by or otherwise associated with service provider B 108. CPE A 102*a*, 102*b* may generally be referred to as CPE A 102, and may sometimes be referred to herein as a calling device. CPE A 102 may be a CPE device, such as a VoIP phone, VoIP soft client, or the like, having a unique telephone number assigned to it and operative to initiate and receive VoIP calls.

According to an example, SIP may be utilized to set up the call session between CPE A 102 and CPE B 104. Thus, the communication received by service provider B 108 may be a SIP invite request message including a SIP identity header. In an example, the SIP identity header may be generated for the communication using the STIR protocol described above. For instance, the calling service provider may use an authentication service to create a SIP identity header, which may include a SHAKEN token signed by the calling service provider. The SHAKEN token may include information such as the calling device's telephone number (TN-A), the called device's telephone number (TN-B), a timestamp, an attestation level determined for the communication, an origination identifier, etc.

The first network device 114 of service provider B 108 may be configured as a VoIP gateway, a session border controller (SBC), or the like. The first network device 114 may operate to receive the communication (e.g., SIP invite request) and send the communication to the soft switch 116. The soft switch 116, for example, may operate to control and process calls over service provider B's communications network.

In some examples, the soft switch 116 may be configured to communicate with the verification server 122 to verify the SHAKEN token in the identity header. Depending on the results of the verification, the verification server 122 may pass information to the soft switch 116 in a verification status (verstat) indicating the results of the verification. For example, if verification is successful, the soft switch 116 may be configured to make a determination whether to complete or block the call based on the attestation level. As an example, when a call with a Level A attestation is received by service provider B 108, a determination may be made that the calling telephone number in a caller identifier (ID) of the received call is accurate and has not been spoofed. As such, the soft switch 116 may route the call to the intended called device (e.g., CPE B 104) via the second network device 118. However, if service provider B 108 receives a call with a Level C attestation, a determination may be made to change a caller ID associated with the call (e.g., change the caller ID from a number or name to "Unknown") and/or forward the call to the called device (e.g., CPE B 104). In some examples, the soft switch 116 may be configured to automatically filter out any call with a Level C attestation, or the called device may be configured to do so.

In some examples, the soft switch 116 may further operate to determine whether the communication is destined to a CPE that may potentially forward (sometimes referred to herein as "divert") the communication to a new destination. For example, a user of the CPE B 104 may set a call-forwarding function to forward all calls to another device (e.g., CPE C 106). In one example, the determination may be made based on tracked historical observations about CPE communication forwarding behaviors. For example, information about a number, percent, or other metric associated with incoming communications forwarded by a CPE (e.g., SIP customers, time division multiplexing (TDM) customers) over a time period may be stored in a data store (herein referred to as call forward data store 124). In some examples, the stored call forward data may be evaluated against a threshold for determining a degree to which the number, percent, or other metric associated with incoming communications forwarded by a CPE deviate from what has been typically observed about CPE forwarding behaviors. For example, the stored call forward data may include information indicating that a CPE (e.g., CPE B 104) has been observed to forward communications at a rate or to a degree that meets or exceeds the threshold. Accordingly, the stored call forward data may include information that may indicate a degree of likelihood that CPE B 104 will forward an incoming communication. In some examples, the stored call forward data may indicate additional information about call forwarding observations, such as a time period (e.g., time of day, day of the week, month of the year) when communications are forwarded by CPE B 104 at a higher rate or to a higher degree than a rate or degree than is typically observed. Thus, the stored call forward data may further include information that may indicate a degree of likelihood that CPE B 104 will forward an incoming communication based on a current time.

According to an example, when the soft switch 116 makes a determination that the called device is a CPE that is likely to forward the verified communication, prior to (or in parallel with) routing the communication to the called device, the soft switch 116 may operate to store identity information about the communication in a data store, herein referred to as a call identity data store 126. For example, the soft switch 116 may be configured to send a request to the call identity data store 126 to store various identity characteristics of the communication for later retrieval. In some examples, the stored identity characteristics may include the identity header of the communication or various pieces of information from the identity header. As mentioned above, the SHAKEN token included in the identity header may include information such as the calling device's telephone number, the called device's telephone number, a timestamp, an attestation level determined for the communication, an origination identifier (ID), etc. In some examples, the stored identity characteristics may include the verstat and/or the attestation level of the communication. Additionally, a timestamp associated with the time of storage of the identity characteristics in the call identity data store 126 may be included. The timestamp may be generated by the soft switch 116 or the call identity data store 126.

In some examples, the identity characteristics may be stored in association with a terminating trunk group ID or other customer specific reference data (e.g., location or connection data) of CPE B 104. In some examples and as depicted, the call identity data store 126 may be in communication with a customer data store 128 that may store and provide updated customer reference data to the call identity data store 126 about customers, such as customer trunk groups, customer origination IDs, telephone numbers, etc. For example, the customer reference data may be organized or otherwise correlated by CPE such that an outbound and inbound trunk group, customer origination ID, telephone number, or other information for a CPE may be correlated in the call identity data store 126. Additional information may be stored in other examples.

According to an example, the identity information may be stored by the call identity data store 126 for a limited time duration (e.g., 30 seconds, 1 minute). For instance, the time duration may include at least a length of time in which a communication may be routed to a CPE, forwarded by the CPE, and for an indication of the call forward to be received by the soft switch 116. After the limited time duration, the identity information may be deleted. In some examples, identity information may be deleted based on a received indication of the status of the communication. For example, a determinization may be made to delete identity information from the call identity data store 126 in response to receiving a status code indicating a request failure, server failure, global failure, a disconnect, or other error associated with the call setup/invite.

The soft switch 116 may operate to complete a routing determination and then route the communication to the second network device 118. The second network device 118, for example, may be configured as a VoIP gateway, a session border controller (SBC), or the like, and may operate to send the communication (e.g., a call setup or call invite) to CPE B 104. In some examples, STIR/SHAKEN identity pass-through may not be supported, and thus, the communication provided to CPE B 104 may not include the identity header or the attestation value.

In some examples, CPE B 104 may be operative to and, at the time when the call invite is received, be set to divert incoming calls to a new destination in the global network, depicted in FIG. 1 as a forward-to destination 130. For example, the communication originally destined for CPE B 104 may be forwarded or diverted by CPE B 104 to CPE C 106 (sometimes referred to herein as a forward-to device), which may be a customer of a telecommunications network service provider system, (depicted in FIG. 1 as service provider C 132). CPE C 106 may have a unique telephone number (TN-C) assigned to it, which may sometimes be referred to as a forward-to number or divert-to number. When the communication is forwarded or diverted by CPE B 104, the diverted communication including an indication that the call is being diverted/forwarded (herein referred to a diversion indication) to CPE C 106 may be received by the second network device 118. According to an example, when CPE B 104 is connected to the second network device 118 via a SIP trunk, the diversion indication may include a diversion (DIV) header including a call forwarding number (i.e., the telephone number (TN-B) of CPE B 104). According to another example, when CPE B 104 is connected to the second network device 118 via a Primary Rate Interface (PRI) trunk, the diversion indication may include a redirecting number including the call forwarding number (i.e., the telephone number (TN-B) of CPE B 104). The diverted communication may further include the original calling number (TN-A) (of CPE A 102) and the forward-to number (TN-C) (of CPE C 106). The second network device 118 may operate to send the diverted communication to the soft switch 116 to be authenticated and routed to the forward-to destination.

In some examples, when a diverted communication (e.g., communication including a diversion indication) is received by the soft switch 116, the soft switch 116 may be configured to determine one or more authentication processes to perform (e.g., DIV authentication only or DIV authentication and STIR authentication). The authentication processes may be performed by the authentication server 120. The soft switch 116 may determine whether the diverted communication includes a SHAKEN identity header. For instance, when STIR/SHAKEN identity passthrough is supported, the SHAKEN identity header may be included in the diverted communication. In other examples, STIR/SHAKEN identity passthrough may not be supported. Thus, the diverted communication may not include the SHAKEN identity header and the soft switch 116 may determine that a SHAKEN identity header is needed.

In some examples, when a determination is made that a SHAKEN identity header is needed, the soft switch 116 may further operate to determine whether identity information for the original communication that was forwarded/diverted is stored in the call identity data store 126. For instance, the soft switch 116 may perform various matching operations (described below) to determine whether a set of identity information stored in the call identity data store 126 is associated with the diverted communication. When a set of identity information is determined as associated with the diverted communication, the soft switch 116 may be configured to determine whether the identity information includes the previously validated SHAKEN identity header, which can be added to the diverted communication, or various identity characteristics from the previously validated SHAKEN identity header that can be used to perform SHAKEN authentication and generate a second SHAKEN identity header. According to an aspect, when the previously validated SHAKEN identity header or identity characteristics from the previously validated SHAKEN identity header are matched to and used for the diverted communication, the diverted communication may be attested at the attestation level of the original communication. Thus, in some examples, service provider B 108 may be enabled to fully attest the diverted communication, which may provide verification of the identity of the originating party (CPE A 102) of the diverted communication.

Figure 2A:
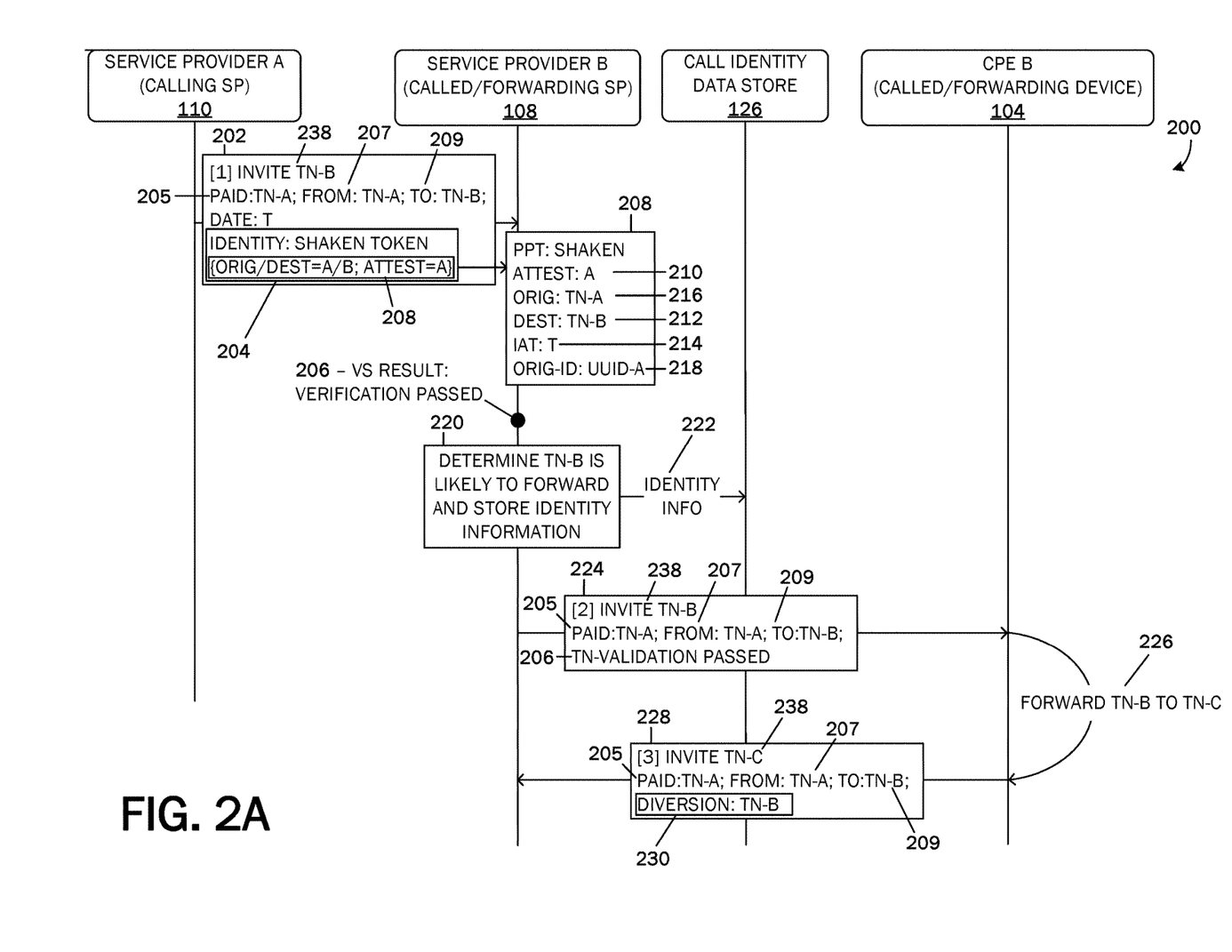
FIGS. 2A-2B is a sequence diagram of an example process for providing identity information handling for supporting end-to-end call identity validation of a forwarded call.
Figure 2B:
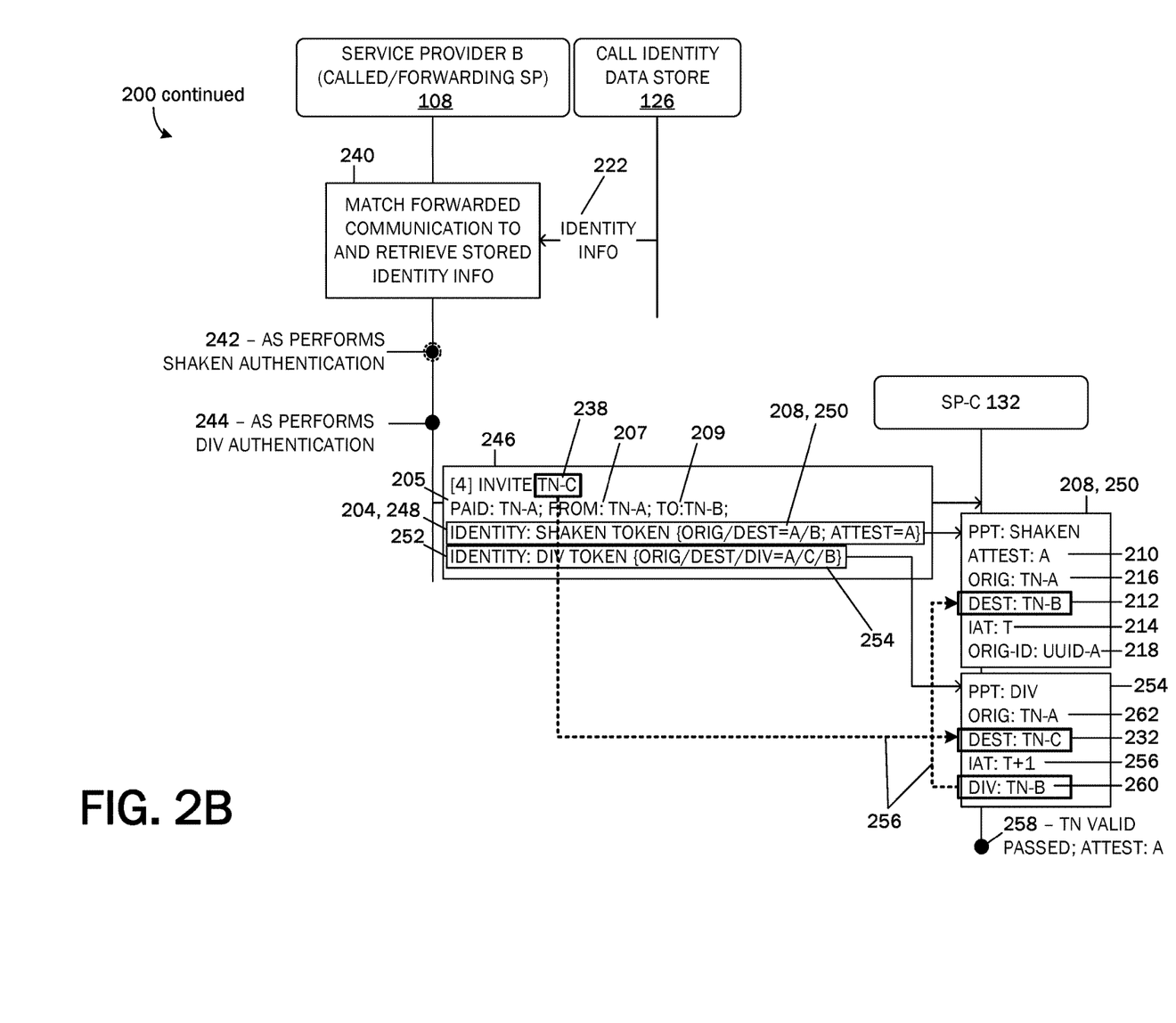

FIGS. 2A-2B include a sequence diagram depicting an example process 200 of providing identity information handling for supporting end-to-end call identity validation of a forwarded communication, such as, for example, a VoIP call according to an example call scenario. In the example call scenario, a VoIP call from CPE A 102 to CPE B 104 is forwarded to CPE C 106 (TNs A/B/C are assigned to service provider A 110, service provider B 108, and service provider C 132, respectively). In some examples, service provider A 110 and service provider B 108 may be the same service provider. With reference now to FIG. 2A, on receiving a first call invite 202 of a call session initiated by the calling party (CPE A), service provider B 108 may use the verification server 122 to verify that the received SHAKEN identity header 204 is valid. As shown in FIG. 2A, the first call invite 202 may include a SHAKEN identity header 204 including a SHAKEN token 208. The SHAKEN token 208, for example, may indicate the attestation level 210 assigned to the first call invite 202, the claimed destination 212 is the called number (TN-B), a timestamp 214, the claimed origin 216 is the calling number (TN-A), and a unique origination identifier 218 corresponding to all or part of the originating service provider's (SP-A) network. According to an example, when the first call invite 202 includes a valid SHAKEN identity header 204, the verification server 122 may provide a verification result 206 to the soft switch 116 indicating the passing result. As shown in FIG. 2A, the first call invite 202 may include additional headers, which may include a request uniform resource identifier (URI) 238 that may include the telephone number of the next hop in the call route (e.g., TN-B in the first call invite 202), P-Asserted Identity (PAID) information 205 carrying the identity of the party sending the call invite as it was verified by authentication (by service provider A (SP-A) 110), from contact information 207 indicating the telephone number of the originator (CPE A 102) of the invite message, and to contact information 209 indicating the telephone number of the called party (CPE B 104).

In some examples, a determination (220) may be made to store (220) identity information 222 associated with the first call invite 202 in the call identity data store 126 for possible later retrieval. Although service provider B 108 and the call identity data store 126 are depicted as separate in FIGS. 2A and 2B, it is understood that the call identity data store 126 may comprise part of service provider B 108. According to an example, such as per local policy, the (original) SHAKEN identity header 204 may not be provided to the called party (CPE B 104) and a determination may be made as to whether CPE B 104 may, based on observed historic data, forward calls at a rate or degree that meets or exceeds a threshold rate/degree. As described above, a determination that CPE B 104 forwards calls at a rate or degree that meets or exceeds the threshold rate/degree may indicate that CPE B 104 may be likely to forward the call invite and may indicate to service provider B 108 to store identity information 222 (e.g., the identity header 204 or identity characteristics included in the identity header 204) associated with the first call invite 202 in the call identity data store 126.

In some examples, after storing (220) the identity information 222, service provider B 108 may route a second call invite 224 to the called party (CPE B 104). The second call invite 224 may convey the PAID information 205 and the from contact information 207 from the first call invite 202. As mentioned above, the second call invite 224 may not include the original SHAKEN identity header 204. On receiving the second call invite 224, CPE B 104 may forward (226) the call to a forward-to destination (CPE C 106). For example, a third call invite 228 may be received from CPE B 104. The third call invite 228, for example, may include a diversion indication 230 (e.g., a DIV header or a redirecting number) that includes the contact information (TN-B) of the device forwarding the call invite (call forwarding number). As shown, the third invite 228 may include the contact information of the forward-to destination (TN-C of CPE C 106) as the resource UID 238, and may further include the PAID information 205 (TN-A), the from contact information 207 (TN-A), and the to contact information 209 (TN-B) from the first and second call invites 202, 224.

The process 200 continues to FIG. 2B, where, upon receiving the third invite 228, a determination may be made that the third invite 228 includes a diversion indication 230 and does not include the original SHAKEN identity header 204. Additionally, the third invite 228 may be matched (240) to stored identity information 222, which may be retrieved (240) for authenticating the forwarded call. In some examples a determination may be made as to whether the call forwarding number in the diversion indication 230 is included as a CPE that may, based on observed historic data, forward calls at a rate or degree that meets or exceeds a threshold rate/degree. According to another example, the soft switch 116 may determine whether the claimed origin 216 (TN-A) of the original SHAKEN identity header 204 included in stored identity information 222 matches the PAID information 205 (TN-A) and/or from contact information 207 (TN-A) included in the third call invite 228. According to another example, the soft switch 116 may further determine whether the claimed destination 212 (TN-B) of the original SHAKEN identity header 204 included in stored identity information 222 matches the call forwarding number (TN-B) included in the diversion indication 230 of the third call invite 228. According to another example, the soft switch 116 may further determine whether a terminating trunk group ID associated with the second network device 118 where the second call invite 224 was routed included in stored identity information 222 matches or belongs to the same terminating trunk group ID of the network device associated with the received third call invite 228. According to another example, a timestamp associated with the time of storage of identity information 222 is within a time window of receiving the third call invite 224. For example, if a determination is made that some or all of the above criteria match, the soft switch 116 may be configured to retrieve the stored identity information 222 (e.g., the original SHAKEN identity header 204 or identity characteristics (e.g., attestation level 210, verification result 206).

In some examples, if the original SHAKEN identity header 204 of the first call invite 202 is stored in the call identity data store 126, service provider B 108 may retrieve and add the original SHAKEN identity header 204 to a fourth call invite 246, where the claimed origin 216 is the calling number (TN-A) and the claimed destination 212 is the called number (TN-B). For example, the original SHAKEN identity header 204 may include the original SHAKEN token 208 signed by service provider A 110. Service provider B 108 may request the authentication server 120 to perform DIV authentication 244 for retargeting the called number (TN-B), where a DIV identity header 252 including a DIV token 254 may be added to the fourth call invite 246. The DIV token 254 may be used to authenticate the forwarding leg of the call session. According to an example, in the DIV token 254, the claimed origin 262 may match the origin claim 216 (the calling number (TN-A)) in the SHAKEN token 208, the claimed destination 232 may include the forward-to number (TN-C), and the claimed diversion 260 may include the telephone number of the forwarding device (TN-B of CPE B 104). In some examples, the DIV token 254 may further include a timestamp 256. The authentication server 120 may further sign the DIV token 254 using service provider B's secret private key. For example, the authentication server 120 may include one or more Secure Key Stores (SKSs) of secret private key(s) or have an authenticated, Transport Layer Security (TLS)-encrypted interface to the SKS(s) which may store the secret private key(s) used to create SHAKEN and DIV signatures.

In other examples, service provider B 108 may request the authentication server 120 to perform SHAKEN authentication 242. If the retrieved identity information 222 includes identity characteristics, such as the attestation level 210 and the verification result 206 of the first call invite 202, the retrieved identity characteristics may be provided in an authentication request provided to the authentication server 120. For example, the authentication server 120 may add a forwarding party-generated SHAKEN identity header 248 including a forwarding party-generated SHAKEN token 250 to the fourth call invite 246, where the claimed origin 216 is the calling number (TN-A) and the claimed destination 212 is the called number (TN-B). Additionally, the forwarding party-generated SHAKEN token 250 may include the attestation level 210 associated with the first call invite 202. The authentication server 120 may sign the forwarding party-generated SHAKEN token 250 using service provider B's secret private key. Service provider B 108 may then request the authentication server 120 to perform DIV authentication 244 as described above to add the DIV token 252 to the fourth call invite 246. Service provider B 108 may then route the fourth call invite 246 to the forward-to destination (service provider C 132 of CPE C 106).

According to an example, when the fourth call invite 246 arrives at service provider C 132, service provider C 132 may perform both SHAKEN and DIV verification procedures. This may include verifying that there is an unbroken chain of authority 256 (depicted in FIG. 2B as a dotted line) from the request URI 238 in the fourth call invite 246 indicating the forward-to number (TN-C of CPE C 106) to the destination claim 212 (TN-B of CPE B 104) in the original/forwarding party-generated SHAKEN token 208, 250. For example, the chain of authority 256 may link: the forward-to number (TN-C of CPE C 106) in the request URI 238 of the fourth call invite 246 to the destination claim 232 (TN-C of CPE C 106) in the DIV token 254; and the diversion claim 260 (TN-B 212 of CPE B 104) in the DIV token 254 to the destination claim 212 (TN-B of CPE B 104) in the original/forwarding party-generated SHAKEN token 208, 250. Accordingly, end-to-end SHAKEN validation for the forwarded call (e.g., fourth call invite 246) is provided. Additionally, in some examples, the SHAKEN validation performed by service provider C 132 may provide a full attestation (attestation level A), where a verstat indication of the full attestation may be provided to CPE C 106. Accordingly, the user of CPE C 106 may be able to trust that the calling TN (TN-A) identifies the calling party (CPE A 102).

Figure 3:
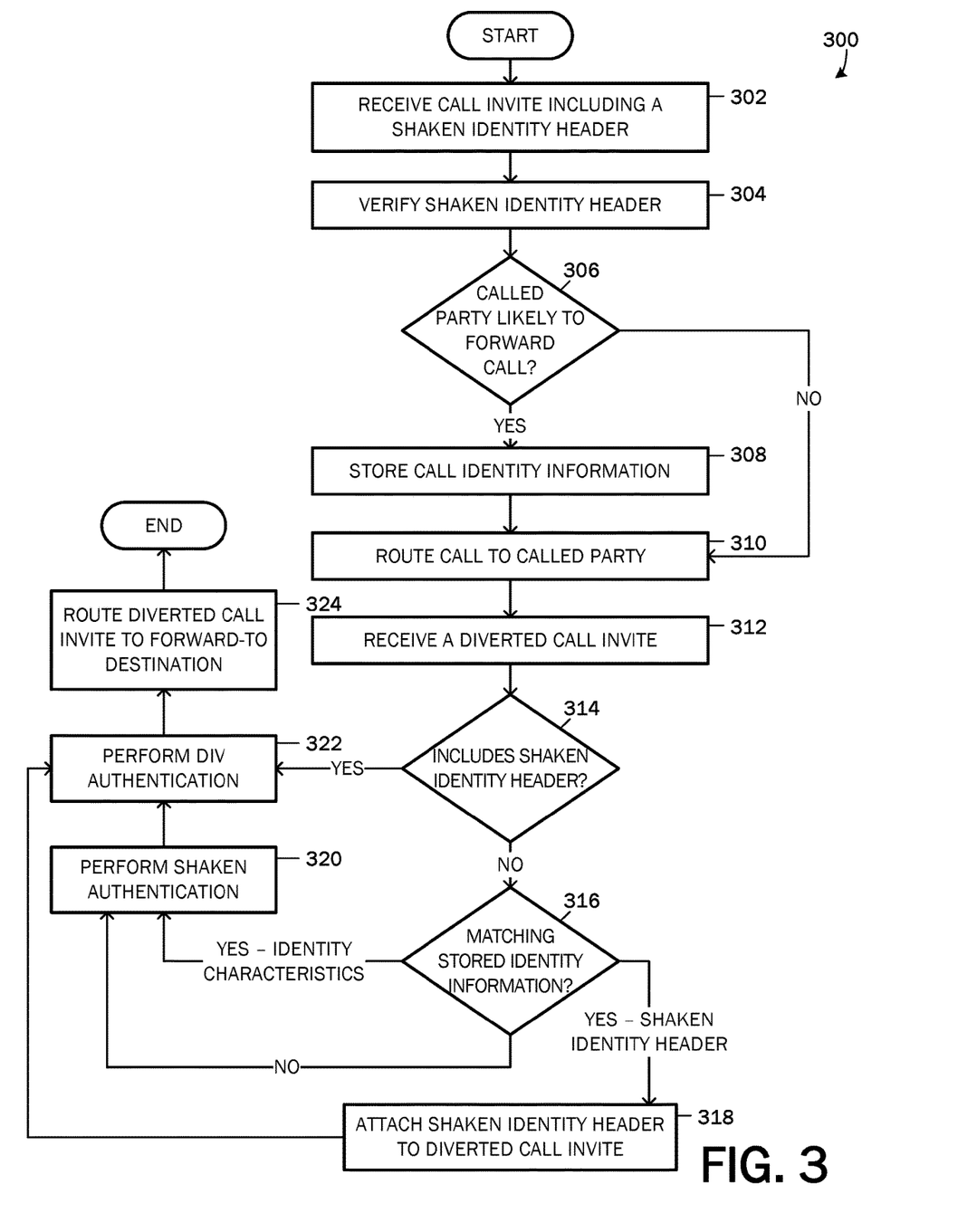
FIG. 3 is a flow chart of an example method for providing identity information handling for supporting end-to-end call identity validation of a forwarded call.

FIG. 3 is a flow diagram illustrating various operations of an example method 300 of providing identity information handling for supporting end-to-end call identity validation of a forwarded VoIP call according to an example. The method 300 may start at operation 302, where a call invite (e.g., first call invite 202) is received by a called party's service provider (e.g., service provider B 108). For example, the call invite may include contact information of the initiator (e.g., CPE A 102) of the call invite, contact information of the called party (e.g., CPE B 104), and an original SHAKEN identity header 204.

At operation 304, the SHAKEN identity header 204 may be verified. For example, the soft switch 116 of the called party's service provider (e.g., service provider B 108) may request and receive a verification result 206 indicating a successful or unsuccessful verification or that no validation occurred. The verification results 206 may further include the attestation value 210 provided by the calling party's service provider (e.g., service provider A 110). When the verification results 206 indicate a successful verification, at decision operation 306, a determination may be made as to whether the called party (e.g., CPE B 104) may be likely to forward the call invite. For example, the soft switch 116 of the called party's service provider (e.g., service provider B 108) may query the call forward data store 124 for call forward data that may indicate a degree of likelihood that CPE B 104 may forward an incoming communication. When the call forward data indicates that CPE B 104 may be likely to forward the call invite, identity information 222 (e.g., the identity header 204 or identity characteristics included in the identity header 204) associated with the received call invite (e.g., first call invite 202) may be temporarily stored in the call identity data store 126 at operation 308. As described above, the identity information 222 may be stored in association with a terminating trunk group ID or other customer specific reference data (e.g., location or connection data) of CPE B 104.

At operation 310, the call (e.g., second call invite 224) may be routed to CPE B 104. In some examples, the call invite may not include the identity header 204 or the attestation value 210.

At operation 312, a diverted call invite (e.g., third call invite 228) may be received. For example, the third call invite 228, which may include a diversion indication 230 indicating that the call is being diverted/forwarded by CPE B 104, may be received by the soft switch 116 of service provider B 108.

At decision operation 314, a determination may be made as to whether the diverted call invite (e.g., third call invite 228) includes the original SHAKEN identity header 204. When a determination is made that the diverted call invite (e.g., third call invite 228) does not include the original SHAKEN identity header 204, at decision operation 316, a determination may be made as to whether the diverted call invite (e.g., third call invite 228) may be matched to identity information 222 temporarily stored in the call identity data store 126. In some examples a determination may be made as to whether the call forwarding number in the diversion indication 230 is included as a CPE that may, based on observed historic data, forward calls at a rate or degree that meets or exceeds a threshold rate/degree. For example, when CPE B 104 is determined as a CPE likely to forward calls, the call identity data store 126 may be queried for identity information 222. In other examples, the soft switch 116 may determine whether the claimed origin 216 (TN-A) of the original SHAKEN identity header 204 included in stored identity information 222 matches the PAID information 205 (TN-A) and/or from contact information 207 (TN-A) included in the diverted call invite (e.g., third call invite 228). In some examples, the soft switch 116 may further determine whether the call forwarding number (TN-B) included in the diversion indication 230 of diverted call invite (e.g., third call invite 228) matches the claimed destination 212 (TN-B) of the original SHAKEN identity header 204 included in stored identity information 222. According to another example, the soft switch 116 may further determine whether a terminating trunk group ID of the network device (e.g., second network device 118) associated with the received diverted call invite (e.g., third call invite 228) matches a terminating trunk group ID associated with the claimed destination 212 (TN-B) of the original SHAKEN identity header 204 included in stored identity information 222. According to another example, a timestamp associated with the time of storage of identity information 222 may be checked to verify that the identity information 222 was stored within a limited time window of receiving the diverted call invite (e.g., third call invite 228). For example, if a determination is made that the above criteria match and the stored identity information 222 includes the original SHAKEN identity header 204, at operation 318, the original SHAKEN identity header 204 may be attached to the diverted call (e.g., fourth call invite 246). Alternatively, if a determination is made that the above criteria match and the stored identity information 222 includes identity characteristics (e.g., attestation level 210, verification result 206), the identity characteristics may be retrieved and used to perform SHAKEN authentication 242 at operation 320. Or, if a determination is made that matching identity information 222 is not stored in the call identity data store 126, SHAKEN authentication 242 may be performed at operation 320 using information included in the received diverted call invite (e.g., third call invite 228). For example, a forwarding party-generated SHAKEN identity header 248 including a forwarding party-generated SHAKEN token 250 may be attached to the diverted call (e.g., fourth call invite 246).

At operation 322, DIV authentication 244 may be performed. For example, a DIV identity header 252 including a generated DIV token 254 may be attached to the diverted call (e.g., fourth call invite 246). The original/forwarding party-generated SHAKEN token 208, 250 and the DIV token 254 may provide a chain of authority 256 from the forward-to number (e.g., TN-C of CPE C 106) in the request URI 238 of the diverted call (e.g., fourth call invite 246) to the destination claim 232 (e.g., TN-C of CPE C 106) in the DIV token 254, and from the diversion claim 260 (e.g., TN-B 212 of CPE B 104) in the DIV token 254 to the destination claim 212 (e.g., TN-B of CPE B 104) in the original/forwarding party-generated SHAKEN token 208, 250.

At operation 324, the diverted call (e.g., fourth call invite 246) may be routed to the forward-to destination (e.g., service provider C 132 of CPE C 106), where the original/forwarding party-generated SHAKEN token 208, 250 and the DIV token 254 may be verified by service provider C 132. Accordingly, end-to-end SHAKEN validation for the forwarded call may be provided.

Figure 4:
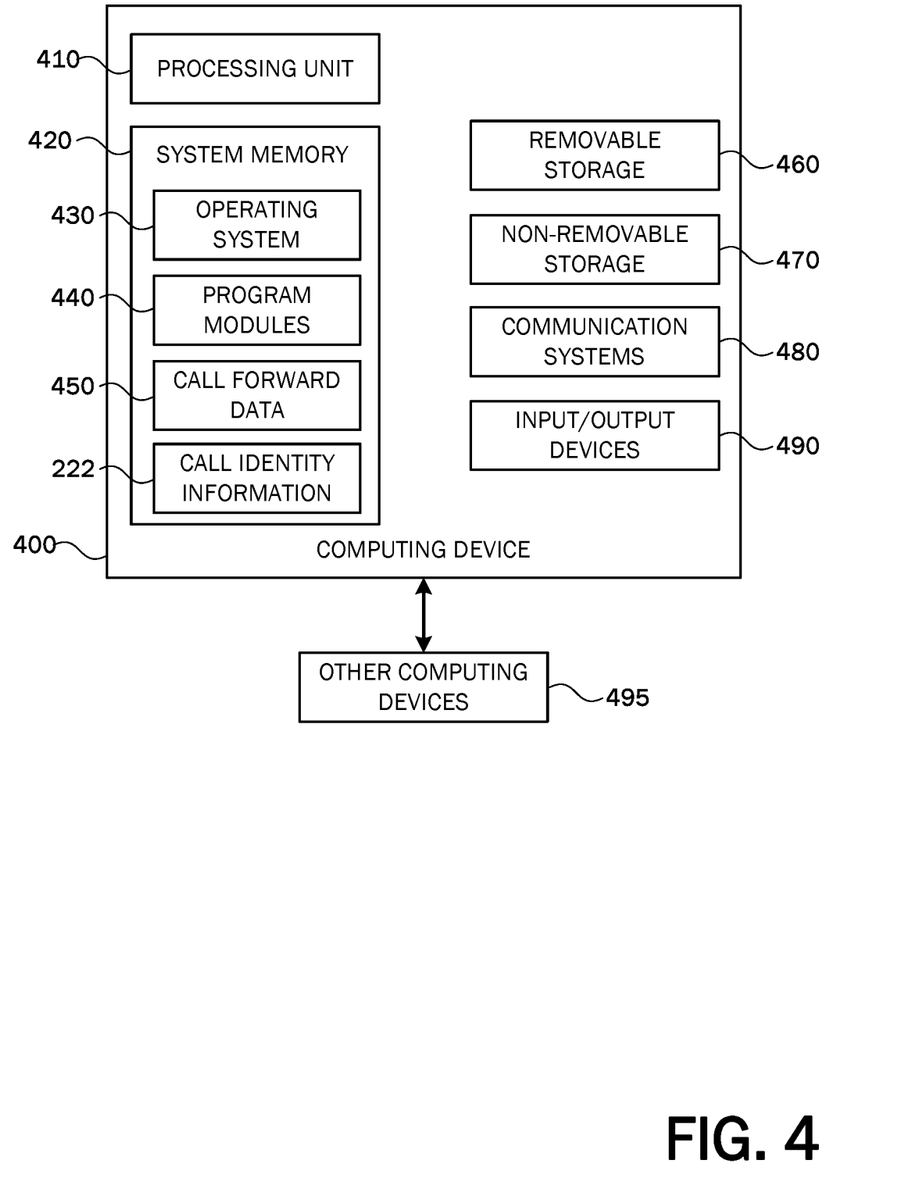
FIG. 4 is a block diagram of a computing device with which one or more aspects of the disclosure may be implemented.

FIG. 4 is a system diagram of a computing device 400 according to an example. The computing device 400, or various components and systems of the computing device 400, may be integrated or associated with one or more of the devices or systems described above, such as the first network device 114, the soft switch 116, the second network device 118, the authentication server 120, the verification server 122, the call forward data store 124, the call identity data store 126, the customer data store 128, and/or CPE B 104. As shown in FIG. 4, the physical components (e.g., hardware) of the computing device 400 are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for selectively storing call identity information 222 based on collected and observed call forward data 450. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, routing engines, gateways, signings systems and the like. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
receiving, by a soft switch, an original call invite initiated by a calling device and directed to a called device, wherein the original call invite includes an original identity header;
verifying, by the soft switch, the original identity header;
determining, by the soft switch, whether the called device is likely to forward the original call invite;
in response to determining the called device is likely to forward the original call invite, storing, by the soft switch, identity information associated with the original call invite in association with customer data associated with the called device;
routing, by the soft switch, the original call invite to the called device;
receiving, by the soft switch, a diverted call invite including an indication that the called device is a forwarding device of the diverted call invite and an indication that a forward-to destination is an intended recipient of the diverted call invite;
determining, by the soft switch, whether the diverted call invite matches the stored identity information associated with the original call invite;
in response to determining the identity information associated with the original call invite matches the diverted call invite, attaching, by the soft switch, the original identity header to the diverted call invite; and
routing, by the soft switch, the diverted call invite to the forward-to destination.

2. The method of claim 1, wherein determining whether the called device is likely to forward the original call invite comprises determining, based on observed historic call data, whether the called device forwards calls at a rate that meets or exceeds a threshold call forwarding rate.

3. The method of claim 1, wherein storing identity information associated with the original identity header comprises storing:
the original identity header; or
one or more identity characteristics included in the original identity header.

4. The method of claim 3, wherein the original identity header comprises an original SHAKEN identity header and storing one or more identity characteristics included in the original SHAKEN identity header comprises storing an attestation level assigned to the original call invite.

5. The method of claim 3, wherein in response to determining the identity information associated with the original call invite includes one or more identity characteristics from the original identity header, including:
one or more identity characteristics in a SHAKEN authentication request; and
a resulting forwarding party-generated SHAKEN identity header in the diverted call invite.

6. The method of claim 1, wherein storing identity information associated with the original identity header comprises:
storing the identity information for a limited time duration; and
after the limited time duration, deleting the identity information.

7. The method of claim 1, wherein determining whether the diverted call invite matches the stored identity information associated with the original call invite comprises matching a calling number included in the diverted call invite to a claimed originator of the original call invite.

8. The method of claim 1, wherein determining whether the diverted call invite matches the stored identity information associated with the original call invite comprises matching a call forwarding number included in an indication that the called device is the forwarding device of the diverted call invite to a claimed destination of the original call invite.

9. The method of claim 8, wherein determining whether the diverted call invite matches the stored identity information associated with the original call invite comprises matching a terminating trunk group identifier of a network device used to receive the diverted call invite from the called device to a terminating trunk group identifier associated with the claimed destination of the original call invite.

10. The method of claim 1, wherein determining whether the diverted call invite matches the stored identity information associated with the original call invite comprises determining whether a timestamp associated with the stored identity information is within a time window of receiving the diverted call invite.

11. A system, comprising:
at least one processor; and
memory storing instructions that, when executed by the at least one processor, cause the system to:
receive an original call invite initiated by a calling device and directed to a called device, wherein the original call invite includes an original identity header;
verify the original identity header;
determine whether the called device is likely to forward the original call invite;
in response to determining that the called device is likely to forward the original call invite, store identity information associated with the original call invite in association with customer data associated with the called device;
route the original call invite to the called device;
receive a diverted call invite including an indication that the called device is a forwarding device of the diverted call invite and an indication that a forward-to destination is an intended recipient of the diverted call invite;
determine whether the diverted call invite matches the stored identity information associated with the original call invite;
in response to determining the identity information associated with the original call invite matches the diverted call invite, attach the original identity header to the diverted call invite; and
route the diverted call invite to the forward-to destination, wherein the diversion identity header and the original identity header provide end-to-end call identity validation of the diverted call invite.

12. The system of claim 11, wherein in determining whether the called device is likely to forward the original call invite, the instructions cause the system to determine, based on observed historic call data, whether the called device forwards calls at a rate that meets or exceeds a threshold call forwarding rate.

13. The system of claim 11, wherein the stored identity information associated with the original identity header comprises:
the original identity header; or
one or more identity characteristics included in the original identity header.

14. The system of claim 13, wherein:
the original identity header comprises an original SHAKEN identity header; and
the one or more identity characteristics include an attestation level assigned to the original call invite.

15. The system of claim 13, wherein in response to a determination that the identity information associated with the original call invite includes one or more identity characteristics from the original identity header, the instructions further cause the system to include:
the one or more identity characteristics in a SHAKEN authentication request; and
a resulting forwarding party-generated SHAKEN identity header in the diverted call invite.

16. The system of claim 15, wherein the forwarding party-generated SHAKEN identity header includes an attestation level assigned to the original call invite.

17. The system of claim 11, wherein in storing identity information associated with the original identity header, the instructions cause the system to:
store the identity information for a limited time duration; and after the limited time duration, delete the identity information based on receiving a status code indicating at least one of a request failure, server failure, global failure, disconnect, or other error associated with the original call invite.

18. The system of claim 11, wherein in determining whether the diverted call invite matches the stored identity information associated with the original call invite, the instructions cause the system to perform at least one of:
match a calling number included in the diverted call invite to a claimed originator of the original call invite;
match a call forwarding number included in an indication that the called device is the forwarding device of the diverted call invite to a claimed destination of the original call invite;
match a terminating trunk group identifier of a network device used to receive the diverted call invite from the called device to a terminating trunk group identifier associated with the claimed destination of the original call invite; and
determine a timestamp associated with the stored identity information is within a time window of receiving the diverted call invite.

19. The system of claim 18, wherein the indication that the called device is the forwarding device includes a diversion header including contact information of the called device.

20. A non-transitory computer-readable storage medium storing instructions that, when executed by at least one processor, cause the at least one processor to:
receive an original call invite initiated by a calling device and destined for a called device, wherein the original call invite includes an original SHAKEN identity header;
verify the original SHAKEN identity header;
determine whether the called device is likely to forward the original call invite;
in response to determining that the called device is likely to forward the original call invite, temporarily store identity information associated with the original call invite in association with customer data associated with the called device;
route the original call invite to the called device;
receive a diverted call invite including an indication that the called device is a forwarding device of the diverted call invite and an indication that a forward-to destination is an intended recipient of the diverted call invite;
when the diverted call invite does not include the original SHAKEN identity header, match the diverted call invite to the temporarily stored identity information associated with the original call invite;
in response to determining the identity information associated with the original call invite includes the original SHAKEN identity header, attach the original SHAKEN identity header to the diverted call invite;
in response to determining the identity information associated with the original call invite includes one or more identity characteristics from the original SHAKEN identity header:
include the one or more identity characteristics in a SHAKEN authentication request, wherein the one or more identity characteristics include an attestation level assigned to the original call invite; and
include a resulting forwarding party-generated SHAKEN identity header in the diverted call invite;
include the indication that the forward-to destination is the intended recipient of the diverted call invite and the indication that the called device is the forwarding device of the diverted call invite in a diversion authentication request;
include a resulting diversion identity header in the diverted call invite; and
route the diverted call invite to the forward-to destination, wherein the diversion identity header and the original or forwarding party-generated SHAKEN identity header provide end-to-end call identity validation of the diverted call invite.

* * * * *